Patented June 5, 1951

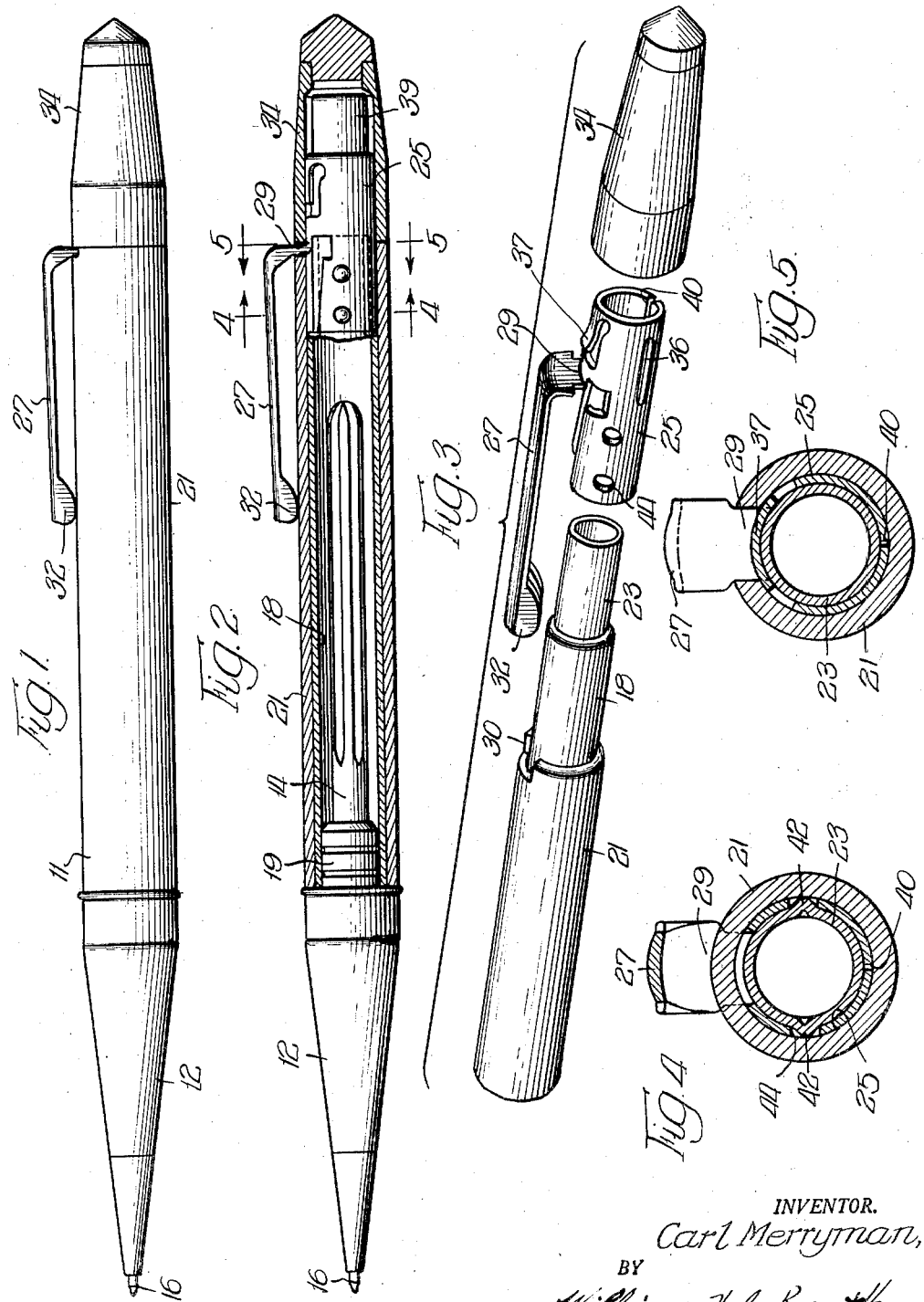

2,555,985

UNITED STATES PATENT OFFICE 2,555,985

PENCIL CLIP

Carl Merryman, Melrose Park, Ill., assignor to Dur-O-Lite Pencil Company, Melrose Park, Ill., a corporation of Delaware Application September 24, 1948, Serial No. 50,926

3 Claims. (Cl. 24—11)

This invention relates to a new and improved pocket clip for writing instruments or the like and more particularly to a clip construction especially adapted for firm and permanent connection to the body of the unit to which it is attached.

While the present invention is shown and described in connection with a specific type of mechanical pencil, it will be understood that it is of broader application and may be used with other types of pencils, pens, ball point writing instruments or other devices of similar shape adapted to be carried in the pocket.

A large proportion of devices of this character are provided with metal clips adapted to grip the pocket edge and thus prevent accidental displacement of the device. It is important that these clips be formed of stiff resilient metal which will not become deformed or lose its resilience under normal use. Such clips are usually formed of spring steel. In the majority of commercial applications of such clips they are provided with spaced lugs which pass through slots in the outer barrel or the cap of the unit to which the clip is attached and are then bent over or clinched against the inner face of the wall through which they extend. Such constructions are difficult to provide in that, if the spring steel is properly tempered, the sharp bending and clinching of the lugs is likely to fracture the steel. A further objection presents itself when the clips are attached to thin walls formed of plastic, as is the case with many pens and pencils. The lugs on the clips are not widely spaced and the necessary slots in the thin plastic walls further weaken them so that an unusual jerk or sudden strain on the clip may break away the piece of the wall to which the lugs are clamped.

It is an object of the present invention to provide a new and improved pocket clip construction for pencils or similarly shaped articles.

It is a further object to provide a construction of this character in which the clip is firmly connected to interior structural elements of the article.

It is also an object to provide a clip having an integral anchoring means which is formed to its final shape prior to assembly with the article.

It is another object of the invention to provide a clip for use with articles having metallic interior elements within a housing of plastic or the like in which the clip extends through the housing and is firmly secured to a metallic interior element.

It is an additional object to provide a clip with integral securing means which is simple in design and construction and adapted for commercial production and use.

It is a further object to provide, in combination with the clip, means for retaining a pencil cap in position.

Other and further objects will appear as the description proceeds.

I have shown certain preferred embodiments of my invention in the accompanying drawings, in which—

Figure 1 is an elevation of a mechanical pencil equipped with the improved clip;

Figure 2 is a view similar to Figure 1 with parts broken away and parts in section to show the internal construction;

Figure 3 is an exploded view of the clip and associated parts of the pencil;

Figure 4 is a section on an enlarged scale taken on line 4—4 of Figure 2; and

Figure 5 is a section on an enlarged scale taken on line 5—5 of Figure 2.

As shown in the drawings, the invention is applied to a mechanical pencil having a tubular plastic barrel or housing member 11, a pointed section 12 and interior mechanism 14 for propelling the lead 16. The particular construction of the mechanism forms no part of the present invention and it will not be described in detail.

The pencil comprises the interior tubular metallic member or cylindrical body portion 18 which has its left or lower end, as seen in Figure 2, secured to the enlarged section 19 of the pencil mechanism. This metallic member 18 is enclosed in the tubular plastic housing member 11. The tubular metallic member 18 has an upper reduced portion 23 adapted to closely interfit within the elongated tubular body portion 25 of the clip. The clamping or gripping portion 27 of the clip is integrally connected to an intermediate point on the tubular portion 25 by an inturned reduced section 29. The tubular plastic housing 21 of the pencil is provided with a notch 30 to receive this reduced section 29 of the clip.

The clamping portion 27 of the clip is provided with the inturned gripping sections 32 adapted to engage the edge of a pocket and, by pressing it against the housing 11, secure the pencil in place. The cap 34 is adapted to fit snugly on the upper or right-hand part of the tubular portion 25 of the clip. In order to secure a firm grip on the cap, this part of the tubular body portion is provided with the outwardly pressed ridges 36 and the longitudinally extending outwardly inclined resilient tongue 37.

As shown in Figure 2, an eraser 39 may be fitted in the open end of the tubular portion 25 of the clip. The tubular portion 25 of the clip is split longitudinally at 40 so that the resilience of the metal aids in gripping the reduced portion 23 of the tubular metal section 18 and also in gripping the eraser 39. This longitudinal split also permits the upper part of the tubular portion 25 to expand as the eraser 39 is forced into it, this expansion causing a firm grip upon the inside of the removable cap 34. The resilient tongue 37 which extends longitudinally of the clip aids in holding the cap 34 in place both directly and because inward pressure against the tongue 37 causes the adjacent upper portion of the clip to flatten which serves to spread the upper portion of the longitudinal split 40. This is of particular advantage in holding the cap 34 in place when no eraser is in the clip, as may be the case when the eraser is lost or is used up.

When the clip is assembled on the reduced section 23, this section preferably has portions 42 deformed and pressed outwardly into perforations 44 in the clip body, as best shown in Figure 4. It will be noted that the depth of the notch 30 in the plastic housing 21 is such as to fully accommodate the portion 29 of the clip so that the clip fits snugly against the lower edge of the cap member 34.

The tubular metallic body member 18 of the pencil is usually formed of relatively soft metal, such as brass, and the portions 42 may be formed without difficulty and without damaging the member. The entire clip is a unitary section of spring metal, preferably spring steel, and it will be apparent that once it is formed there are no parts which are bent or deformed in assembling it upon the pencil. Thus, it may be heat-treated for the necessary resilience after it is formed. It is positively locked in place by the deformation at 42 of the relatively soft metal tube 18. The resilient tongue 37 also aids in holding the cap 34 against accidental displacement, yet permits its ready removal when it is desired to use the eraser 39.

While one preferred form of construction has been shown in combination with a specific form of pencil, it will be understood that it may be changed to meet differing conditions and requirements and, therefore, such modifications are contemplated as come within the spirit and scope of the appended claims.

I claim:

1. An article of manufacture for use as a part of a mechanical pencil assembly comprising a resilient split tubular member for association on the end of a pencil and adapted to receive a cap thereon, an integral clamping portion extending from the tubular member, and an integral longitudinally extending tongue formed from the tubular member opposite the split therein, said tongue normally inclining outwardly and downwardly from the tubular member and assisting in holding the pencil cap thereon, pressure of a cap on the tongue also serving to flatten the tongue side of the tubular member and spread the split side of the member to grip the cap.

2. A pocket clip for pencils or the like comprising a unitary piece of thin resilient material in the form of a tubular member with a longitudinal split therein, an integral clamping member struck up from the body upon the side opposite the split and joining an intermediate part of the tubular member, and an integral outwardly inclined resilient tongue formed from the tubular member on the side opposite the split, the attached end of the tongue joining the tubular member adjacent one end thereof, whereby pressure on the tongue flattens the tongue side of the tubular member and spreads apart the opposite portion of the split side of the member.

3. In combination a pencil or the like and a clip permanently secured thereto, the pencil comprising a tubular housing, a tubular metallic member in the housing, the tubular metallic member being provided with a reduced upper portion within the upper end of the housing, and a removable cap, the clip being formed of thin spring metal and having a tubular body with a longitudinal split throughout one side of the body, a clamping portion integrally connected to an intermediate part of the tubular body of the clip, the lower portion of said tubular body fitting around the reduced upper portion of the tubular metallic member and being permanently secured thereto within the tubular housing, a longitudinally extending integral tongue formed from the upper portion of the tubular body of the clip and extending outwardly and downwardly from a point adjacent the upper edge of the body on the side opposite the split whereby pressure on the tongue by placing the removable pencil cap thereon flattens the tongue side of the tubular member and spreads apart the opposite portion of the split side of the tubular body of the clip to frictionally grip the cap.

CARL MERRYMAN.

REFERENCES CITED

The following references are of record in the file of this patent:

UNITED STATES PATENTS

| Number | Name | Date |
| --- | --- | --- |
| 368,934 | Cheney | Aug. 30, 1887 |
| 1,116,078 | Klein et al. | Nov. 3, 1914 |
| 1,426,744 | Keeran et al. | Aug. 22, 1922 |
| 1,519,700 | Phillips | Dec. 16, 1924 |
| 1,921,270 | Talt | Aug. 8, 1933 |
| 1,923,153 | Lang | Aug. 22, 1933 |
| 2,010,466 | Robbins | Aug. 6, 1935 |